Patented Oct. 19, 1943

2,332,048

UNITED STATES PATENT OFFICE 2,332,048

PREPARATION OF WATER-SOLUBLE CARBOXYETHYL CELLULOSE ETHER

Louis H. Bock, Huntingdon Valley, and Alva L. Houk, Philadelphia, Pa., assignors to Röhm & Haas Company, Philadelphia, Pa., a corporation of Delaware No Drawing. Application January 17, 1942, Serial No. 427,204

5 Claims. (Cl. 260—231)

This invention relates to a method of preparing a carboxyethyl ether of cellulose.

Water-soluble carboxyethyl cellulose ether is obtained by reacting between 5° C. and 35° C. cellulose with an aqueous solution containing from about 10% to about 40% of a strongly basic, water-soluble hydroxide and at least one molecular proportion of acrylonitrile per glucose unit of the cellulose; the amount of hydroxide being at least molecularly equivalent to the acrylonitrile reacting with the cellulose, until the reaction mixture is extensible with water to form a substantially homogeneous solution or paste.

As the initial material for this process there may be used any form of cellulose, including cotton, regenerated cellulose, or cellulose obtained from wood pulp by the removal of lignin and resins or from flax or other bast plants by the usual means.

As the strongly basic, water-soluble hydroxide there may be used any hydroxide of an alkali metal, such as sodium hydroxide or potassium hydroxide, or a strongly basic quaternary ammonium hydroxide, such as benzyl trimethyl ammonium hydroxide, dibenzyl dimethyl ammonium hydroxide, or the like, or a mixture of such hydroxides. While any concentration of one or more of these hydroxides from 10% to 40% may be used, the desired ethers are produced most rapidly when aqueous solutions containing 20% to 30% of hydroxide are used. The amount of hydroxide required is at least equivalent to the acrylonitrile reacted.

In the reaction of cellulose, hydroxide, and acrylonitrile to form water-soluble products, the preferred procedure consists in mixing cellulose in a finely divided or fibrous form with a solution of a strong hydroxide and then adding acrylonitrile. The temperature of the reaction mixture is held between 5° C. and 35° C., although the best results are obtained when the temperature is 10° to 25° C. The time required to produce a water-soluble product varies somewhat with the temperature, longer times being necessary at lower temperatures. A reaction period of at least one and one-half hours is generally required. In one particularly effective mode of operation the cellulose is mixed with the hydroxide solution and this mixture is allowed to stand for several hours or more. The acrylonitrile is then stirred into this "ripened" or "aged" mixture and stirring is continued until the product is soluble in water. Reaction time is a minimum when one to two mols of acrylonitrile is used per glucose or $C_6$ unit. Larger proportions of acrylonitrile may be used, but the period of reaction must then be extended.

After the acrylonitrile has been reacted with cellulose and hydroxide, the carboxyethyl cellulose ether may be isolated, if desired, by neutralizing the alkaline reaction mixture with an acid, such as acetic, hydrochloric, or sulfuric, and precipitating the ether by addition of a water-miscible, organic solvent such as methyl alcohol, ethyl alcohol, or acetone. The product may then be separated from solvent, washed with the precipitating liquid, and dried. The dried product slowly redissolves in water to form a viscous solution.

For many applications the product need not be thus isolated. It may often be used in the form of the reaction mixture. Thus, the alkali of the reaction mixture may be neutralized to give a viscous solution or the reaction mixture may be carried to an acid state without precipitation of this cellulose ether. The viscous solutions thus formed may be used directly, even though they contain a salt. Compatibility with salts is one of the important characteristics of this type of cellulose ether. Another distinguishing feature of these cellulose ethers is their solubility in hot solutions.

The following examples are given to illustrate this invention.

Example 1

A mixture of 170 parts of cellulose from wood pulp and 530 parts of 15% sodium hydroxide solution was stirred for an hour at 10° C. There was then gradually added 79.5 parts of acrylonitrile and stirring was continued for three hours at 10° C. The reaction mixture was diluted with water to form a viscous, clear solution, which was neutralized with acetic acid without precipitation. A large volume of methanol was then added to precipitate the carboxyethyl cellulose ether. The ether was dried and ground. The dry product was slowly dissolved by water to give a gelatinous solution.

Example 2

170 parts of alpha cellulose flock (purified cellulose from paper pulp) and 400 parts of 20% sodium hydroxide solution were mixed in a Werner-Pfleiderer mixer, the mixture cooled to 10° C., and 52 parts of acrylonitrile added thereto. Mixing was continued for two hours with the temperature held below 10° C. and continued for 16 hours with the temperature allowed to rise to 25° C. The reaction mixture was diluted with water, neutralized with acetic acid, and diluted to 2933 parts with additional water. The resulting solution was clear and very viscous, exhibiting a tendency to gel on standing.

Example 3

A mixture of 255 parts of purified cellulose from wood pulp, ground to a 40 mesh size, and 600 parts of 20% sodium hydroxide solution was stirred for one-half hour at 10° C. To this mixture was added 119.5 parts of acrylonitrile and stirring was continued for two hours. The reaction mixture was diluted with 3045 parts of water and neutralized with concentrated hydrochloric acid to yield a clear, viscous syrup.

Example 4

A mixture of 255 parts of alpha cellulose flock from wood pulp, and 400 parts of 30% sodium hydroxide solution was stirred at 13° C. for about one-half hour. 119.5 parts of acrylonitrile was added and the resulting mixture stirred for two hours. The reaction mixture was diluted with 3245 parts of water and neutralized with hydrochloric acid to give a clear, viscous solution.

Example 5

170 parts of cellulose from wood pulp and 267 parts of 30% sodium hydroxide solution were intimately mixed and stored at room temperature for 18 hours in a closed container. The mixture was cooled to 13° C., placed in a Werner-Pfleiderer mixer and stirred while 79.5 parts of acrylonitrile was added. Stirring was continued for two hours. The reaction mixture was diluted with 2160 parts of water and neutralized with hydrochloric acid to give a highly viscous solution.

Example 6

170 parts of regenerated cellulose fibers and 400 parts of 20% sodium hydroxide solution were mixed and stored at room temperature for 18 hours in a closed container. The mixture was then cooled to 13° C., placed in a Werner-Pfleiderer mixer, and treated with 106 parts of acrylonitrile. This mixture was stirred for two hours at a temperature of 13° C. The reaction mixture was diluted with 2000 parts of water and neutralized with sulfuric acid, yielding a clear, syrupy solution.

Example 7

170 parts of alpha cellulose from wood pulp and 800 parts of 10% sodium hydroxide solution were mixed and stored at room temperature for 18 hours in a closed container. This ripened mixture was transferred to a Werner-Pfleiderer mixer, treated with 79.5 parts of acrylonitrile, and stirred for five hours at room temperature. The reaction mixture was diluted with 1625 parts of water and neutralized with hydrochloric acid to give a very stiff, smooth syrup.

Example 8

170 parts of cotton linters, 79.5 parts of acrylonitrile, and 200 parts of 40% sodium hydroxide solution were mixed at 25° C. for 16 hours. The mixture was diluted with water and neutralized with sulfuric acid to give 2980 parts of an approximately 8% cellulose ether solution, which was highly viscous.

Example 9

170 parts of alpha cellulose from wood pulp was mixed with 200 parts of a 40% solution of trimethyl benzyl ammonium hydroxide, cooled to about 5° C., 80 parts of acrylonitrile was added, and the resulting mixture stirred for two hours at 5° C. and then for two hours while the temperature of the mixture rose to about 20° C. Water was added, acetic acid stirred in until neutrality was reached, and the final weight of solution adjusted to 2930 parts. A viscous, slightly turbid solution was obtained.

By reacting cellulose with a strong hydroxide and acrylonitrile in the proportions set forth above at a temperature between about 5° C. and about 35° C. for a period of one and one-half hours or more, there is obtained a β-carboxyethyl cellulose ether which is soluble in water, even in the fully acid state. This product is useful as a thickening agent for printing pastes, coating materials, sizes, and the like, and as a protective colloid for stabilizing emulsions.

We claim:

1. A method of preparing a water-soluble carboxyethyl cellulose ether from cellulose which comprises reacting in the temperature range of 5° C. to 35° C. cellulose with an aqueous solution containing from about 10% to about 40% of a strongly basic water-soluble hydroxide and at least one molecular proportion of acrylonitrile per glucose unit of the cellulose, the amount of the hydroxide being at least molecularly equivalent to the acrylonitrile, reacting with the cellulose, and the reaction being continued until the reaction mixture is extensible with water to form a substantially homogeneous solution, even when acidified.

2. A method of preparing a water-soluble carboxyethyl cellulose ether from cellulose which comprises reacting at a temperature between about 10° C. and about 25° C. fibrous cellulose with an aqueous solution of 20% to 30% of an alkali metal hydroxide and from about one to about two molecular proportions of acrylonitrile per glucose unit of the cellulose, the amount of said hydroxide being at least molecularly equivalent to the acrylonitrile, reacting with the cellulose, and the reaction being continued until the reaction mixture is extensible with water to form a substantially homogeneous solution, even when acidified.

3. A method of preparing a water-soluble carboxyethyl cellulose ether from cellulose which comprises reacting in the temperature range of 5° C. to 35° C. cellulose with an aqueous solution containing from about 10% to about 40% of a strongly basic water-soluble hydroxide and at least one molecular proportion of acrylonitrile per glucose unit of the cellulose, the amount of the hydroxide being at least molecularly equivalent to the acrylonitrile, reacting with the cellulose and the reaction being continued until the reaction mixture is extensible with water to form a substantially homogeneous solution, even when acidified, neutralizing the resulting reaction mixture with an acid.

4. A method of preparing a water-soluble carboxyethyl cellulose ether from cellulose which comprises reacting in the temperature range of 5° C. to 35° C. cellulose with an aqueous solution containing from about 10% to about 40% of a strongly basic water-soluble hydroxide and at least one molecular proportion of acrylonitrile per glucose unit of the cellulose, the amount of the hydroxide being at least molecularly equivalent to the acrylonitrile, reacting with the cellulose and the reaction being continued until the reaction mixture is extensible with water to form a substantially homogeneous solution, even when acidified, neutralizing the resulting reaction mixture with an acid, and separating the cellulose ether by adding to the neutral mixture a water-miscible organic liquid in which the prepared carboxyethyl cellulose ether is insoluble.

5. A method of preparing a water-soluble carboxyethyl cellulose ether from cellulose, which comprises reacting at a temperature between about 10° C. and about 25° C. fibrous cellulose with an aqueous solution of 20% to 30% sodium hydroxide and from about one to about two molecular proportions of acrylonitrile per glucose unit of the cellulose, the amount of hydroxide being at least molecularly equivalent to the acrylonitrile, reacting with the cellulose, and the reaction being continued until the reaction mixture is extensible with water to form a substantially homogeneous solution, even when acidified, neutralizing the resulting mixture with acid, and precipitating the cellulose ether by adding to the neutral mixture a water-miscible alcohol.

LOUIS H. BOCK.
ALVA L. HOUK.